(12) United States Patent
Biellmann et al.

(10) Patent No.: US 11,459,969 B2
(45) Date of Patent: Oct. 4, 2022

(54) METHOD FOR CONTROLLING A DC/DC VOLTAGE CONVERTER FOR CONTROLLING A FUEL INJECTOR

(71) Applicant: VITESCO TECHNOLOGIES GMBH, Hanover (DE)

(72) Inventors: Cedrick Biellmann, Toulouse (FR); Thierry Bavois, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/286,893

(22) PCT Filed: Oct. 22, 2019

(86) PCT No.: PCT/EP2019/078667
§ 371 (c)(1),
(2) Date: Apr. 20, 2021

(87) PCT Pub. No.: WO2020/083879
PCT Pub. Date: Apr. 30, 2020

(65) Prior Publication Data
US 2021/0355889 A1  Nov. 18, 2021

(30) Foreign Application Priority Data
Oct. 22, 2018  (FR) .................................... 1859720

(51) Int. Cl.
*F02D 41/20* (2006.01)
*H02M 3/156* (2006.01)
(52) U.S. Cl.
CPC ............ *F02D 41/20* (2013.01); *H02M 3/156* (2013.01)

(58) Field of Classification Search
CPC ........ F02D 41/20; F02D 41/40; F02D 41/402; F02D 41/43; F02D 2041/2006; H02M 3/155; H02M 3/156; F02M 61/60
(Continued)

(56) References Cited

U.S. PATENT DOCUMENTS 8,018,216 B2 * 9/2011 Kakehi .................. F02D 41/20
323/288
2005/0030691 A1 * 2/2005 Bolz ....................... F02D 41/20
361/152
(Continued)

FOREIGN PATENT DOCUMENTS

EP  2 015 431  1/2009
EP  3 113 346  1/2017
(Continued)

OTHER PUBLICATIONS

International Search Report for PCT/EP2019/078667, dated Feb. 5, 2020, 5 pages.
(Continued)

*Primary Examiner* — John Kwon
*Assistant Examiner* — Johnny H Hoang
(74) *Attorney, Agent, or Firm* — Nixon & Vanderhye

(57) ABSTRACT

Disclosed is a method for controlling a DC/DC voltage converter for controlling the current of at least one fuel injector of an internal combustion engine of a motor vehicle, the vehicle including a supply battery and the converter including a coil and a switch. The method includes the steps of measuring the value of the voltage delivered by the battery, of determining a threshold value of the current passing through the coil from the measured value of the voltage and from a predetermined curve of the current as a function of the voltage, and of actuating the opening of the switch when the current passing through the coil reaches the
(Continued)

determined threshold value of the current in order to regulate the power of the converter.

20 Claims, 2 Drawing Sheets

(58) Field of Classification Search
USPC .................................................. 123/470–478
See application file for complete search history.

(56) References Cited

U.S. PATENT DOCUMENTS

| | | | |
|---|---|---|---|
| 2014/0238354 A1* | 8/2014 | Imai ..................... | F02M 51/005 |
| | | | 123/478 |
| 2016/0298565 A1* | 10/2016 | Nagatomo .............. | F02D 41/20 |
| 2018/0320620 A1 | 11/2018 | Satake | |
| 2021/0277843 A1* | 9/2021 | Cannavo ............... | F02D 41/182 |
| 2021/0277844 A1* | 9/2021 | Cannavo ................ | F02D 41/20 |

FOREIGN PATENT DOCUMENTS

| | | |
|---|---|---|
| FR | 2 992 487 | 12/2013 |
| JP | 2017-089437 | 5/2017 |

OTHER PUBLICATIONS

Written Opinion of the ISA for PCT/EP2019/078667, dated Feb. 5, 2020, 5 pages.

* cited by examiner

METHOD FOR CONTROLLING A DC/DC VOLTAGE CONVERTER FOR CONTROLLING A FUEL INJECTOR

This application is the U.S. national phase of International Application No. PCT/EP2019/078667 filed 22 Oct. 2019, which designated the U.S. and claims priority to FR Patent Application No. 1859720 filed 22 Oct. 2018, the entire contents of each of which are hereby incorporated by reference.

BACKGROUND OF THE INVENTION

Field of the Invention

The invention relates to the field of fuel injection control and concerns more particularly a method for controlling a DC/DC voltage converter for controlling a fuel injector, as well as a control unit implementing this method and a vehicle comprising such a control unit.

Description of the Related Art

In a motor vehicle with an internal combustion engine, it is known to use a direct current voltage converter, also known by the name DC/DC, in order to provide the power needed to drive fuel injectors. Such a converter makes it possible in particular to transform the voltage supplied by the vehicle battery, for example of the order of 12 V, into a higher target output voltage, for example 60 V, which makes it possible to recharge a so-called intermediate capacitor connected at the output of the converter and which supplies current to a controller making it possible, when actuated by a control unit, to activate the fuel injectors.

Thus, when the control unit actuates the controller, the latter uses the current supplied by the intermediate capacitor to control the fuel injectors. In doing so, the intermediate capacitor is discharged, and the converter is then activated to recharge it until the output voltage rises to its target value.

The internal working principle of the converter consists in charging a coil with the current supplied by the battery and cutting the current cyclically, using a switch, notably a transistor, for example of the MOS type. When the switch is closed, the coil is charged and when the switch is open, the energy stored in the coil is transferred as a current to the intermediate capacitor in order to recharge it.

In order to allow the converter to be actuated so that the output voltage rises to its target value, it is known to mount a regulation module between the output and the input of the converter, for example of the "PID" or "Bang Bang" type, well known to the person skilled in the art. Bang-bang regulation consists of measuring the output voltage and of actuating the transistor so that the coil transmits a current of maximum intensity when it is necessary to increase the output voltage of the converter to its target value quickly and stopping the current when the measured output voltage of the converter is equal to its target value.

However, such regulation has drawbacks. Indeed, as shown in FIG. 1, the power P of the converter, i.e., its ability to increase its output voltage, varies according to the voltage $V_{bat}$ supplied by the battery of the vehicle. However, this voltage varies according to the charge level of the battery in particular. Thus, when the voltage $V_{bat}$ supplied by the battery is low, the power P of the converter is lower than the minimum power $P_{min}$, ensuring an optimal operation of the converter. The converter cannot then optimally charge the intermediate capacitor, which is a major drawback. Moreover, when the voltage $V_{bat}$ supplied by the battery is sufficient, the power P of the converter is much higher than the minimum power $P_{min}$. The converter is thus oversized, which causes a drop in its efficiency and which is another drawback.

There is therefore a need for a solution that makes it possible to overcome at least in part these drawbacks.

SUMMARY OF THE INVENTION

To this end, the invention has as its object a method for controlling a DC/DC voltage converter for controlling the current of at least one fuel injector of an internal combustion engine of a motor vehicle, said converter comprising an induction coil connected, on the one hand, to a vehicle battery configured to supply said coil with current and, on the other hand, to a switch actuated alternately in a state of passing the current through the coil or in a state of blocking the current through the coil, the alternation of the passing and blocking states of the switch allowing the converter to deliver an output voltage to the terminals of a so-called "intermediate" capacitor, the discharge of which is actuated by a control module in order to actuate at least one fuel injector, the method being notable in that it comprises:
  a step of measuring the value of the voltage delivered by the battery,
  a step of determining a threshold value of the current passing through the coil from the measured value of the voltage and from a predetermined curve of the current as a function of the voltage, and
  a step of actuating the opening of the switch when the current passing through the coil reaches the determined threshold value of the current in order to regulate the power of the converter.

With the invention, the power of the converter is regulated by determining the threshold value of the current from the voltage delivered by the battery. In this way, the variation in voltage is compensated for by the variation in the threshold value of the current so that the power of the converter remains stable.

Preferably, the power of the converter being defined by the threshold value of the current passing through the coil and by the value of the voltage of the current delivered by the battery, the power is regulated around a predetermined value, preferably of the order of 40 Watts. In this way, the power of the converter remains stable and allows an optimal operation of the injector actuation.

Advantageously, the step of measuring the value of the battery voltage is carried out before starting the DC/DC voltage converter. Thus, the number of measurements of the voltage value is limited.

Preferably, the method comprises a preliminary step of determining the development curve of the threshold value of the current as a function of the value of the voltage of the current delivered by the battery.

Advantageously, the curve is determined by simulation or by laboratory measurement. Thus, the curve is obtained for the converter in order to optimize the regulation of the power of the converter.

Preferably said determined curve is stored in a memory area of a vehicle control unit.

The invention is furthermore aimed at a control unit intended to be mounted in a motor vehicle with an internal combustion engine, said engine comprising at least one fuel injector, said control unit comprising a DC/DC voltage converter for controlling the current of said at least one fuel injector, said converter comprising an induction coil connected, on the one hand, to a vehicle battery configured to supply said coil with current and, on the other hand, to a switch actuated alternately in a state of passing the current through the coil or in a state of blocking the current through the coil, the alternation of the passing and blocking states of the switch making it possible for the converter to deliver an output voltage to the terminals of a so-called "intermediate" capacitor, the discharge of which is actuated by a control module in order to actuate at least one fuel injector, the control unit being notable in that it is configured to measure the value of the voltage delivered by the battery, to determine a threshold value of the current passing through the coil from the measured value of the voltage and from a predetermined curve of the current as a function of the voltage, and to actuate the opening of the switch when the current passing through the coil reaches the determined threshold value of the current in order to regulate the power of the converter.

Preferably, the control unit is configured to measure the value of the voltage before starting the DC/DC voltage converter.

Also preferably, the control unit comprises at least one memory area in which is stored a predetermined curve of the current passing through the coil as a function of the voltage delivered by the battery.

The invention further relates to a motor vehicle with an internal combustion engine, said engine comprising at least one fuel injector, the vehicle comprising at least one control unit, as described above, for controlling said at least one fuel injector.

Other features and advantages of the invention will appear in the following description made in reference to the annexed figures given by way of non-limiting examples and wherein identical references are given to similar objects.

DESCRIPTION OF THE PREFERRED EMBODIMENTS

The invention will be presented hereinafter in view of implementation in a motor vehicle. However, any implementation in a different context, in particular in any vehicle, is also covered by this invention.

The control unit according to the invention is a control unit intended to be mounted in a motor vehicle with an internal combustion engine in order to control the injection of fuel into the cylinders of said engine.

Figure 1:
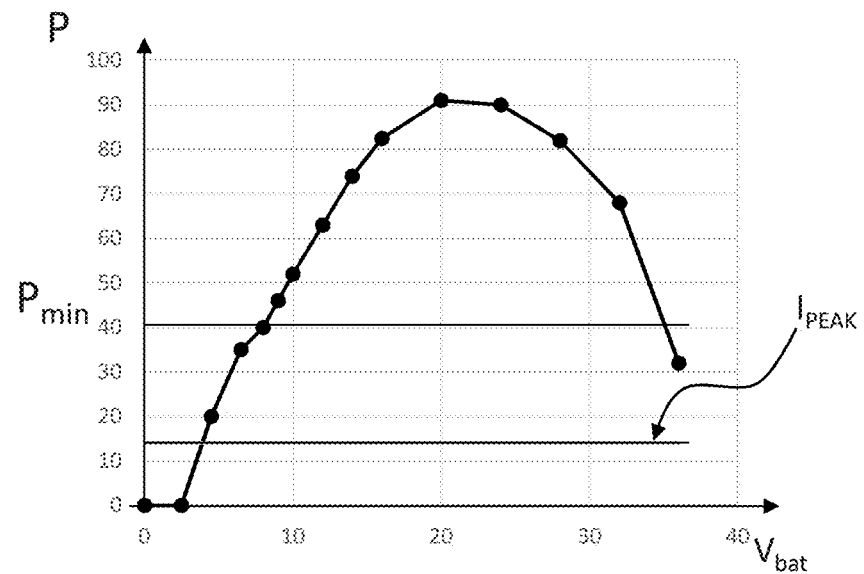
FIG. 1 illustrates schematically a curve showing the development of the power of a converter according to the prior art (presented previously).
Figure 2:
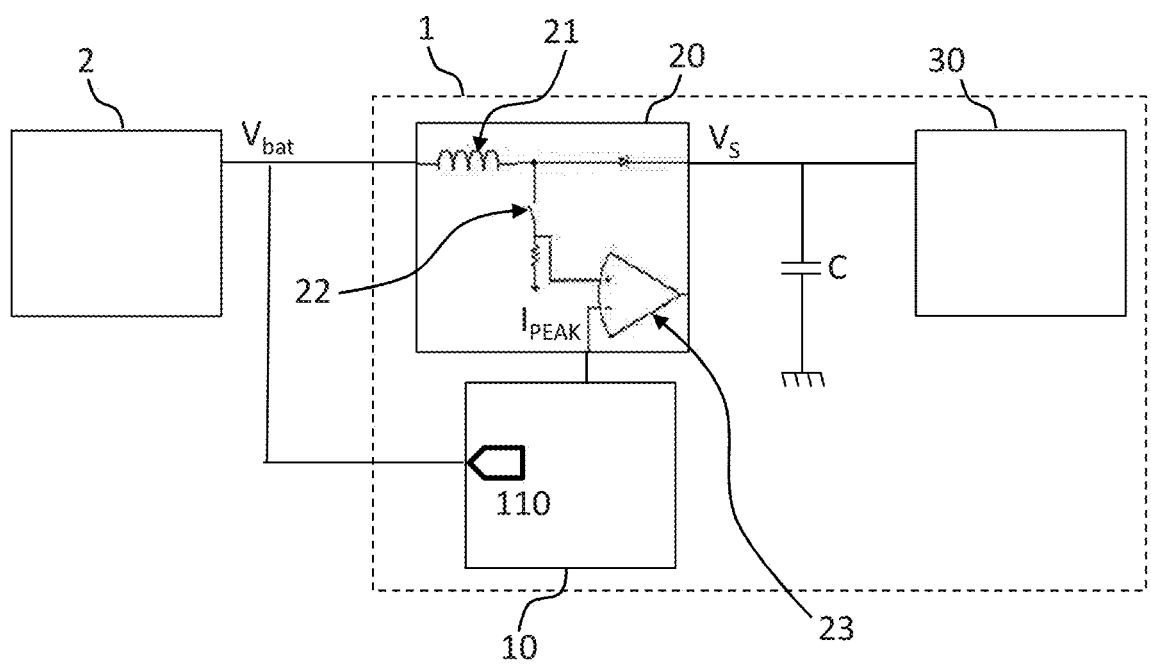
FIG. 2 illustrates schematically an embodiment of a vehicle control unit according to the invention.

As shown in FIG. 2, the vehicle comprises a battery 2, which is used to power equipment (not shown) of the vehicle, an engine (not shown but known per se) and a control unit 1 of said engine.

The battery 2 is an electrical power supply battery on board the vehicle in order to power the electrical equipment of said vehicle. The battery 2 for example delivers a DC voltage the value of which may be of between 6 and 24 V, and that is preferably of the order of 12 V.

The engine is an internal combustion engine comprising a plurality of cylinders, on each of which is mounted at least one fuel injector. An injector is configured to be actuated in order to inject fuel into a cylinder.

The control unit 1 is configured to actuate the fuel injection through the injectors. Such a control unit 1 is an engine control unit, commonly known as an Electronic Control Unit or ECU.

Still in reference to FIG. 2, the control unit 1 includes a microcontroller 10, a DC/DC voltage converter 20 and a control module 30 for the injectors.

The control unit 1 comprises a capacitor C, also called an intermediate capacitor, placed between the converter 20 and the control module 30.

The converter 20 is configured to convert the DC voltage $V_{bat}$ delivered by the battery 2 into a higher value DC output voltage Vs, for example of the order of 60 V, delivered to the control module 30 of the injectors. The output voltage Vs makes it possible to supply the control module 30 with a current having an intensity high enough to control the injectors and to recharge the capacitor C between two injections.

The converter 20 comprises a coil 21, a switch 22 for actuating the charge of the coil 21, and a comparator 23.

The coil 21 is configured to be charged with the current supplied by the battery 2. The switch 22 makes it possible to cyclically charge or to interrupt the flow of charge current from the coil 21 which allows the delivery of the output voltage $V_s$ of the converter 20, the value of which is higher than the voltage $V_{bat}$ supplied by the battery 2 at the input of the converter 20. The switch 22 may also be in the form of a transistor, for example of the MOS type. When the switch 22 is closed, the coil 21 is charged and when the switch 22 is open, the energy stored in the coil 21 is transferred as a current to the capacitor C in order to recharge it.

The coil 21 is configured to charge until the value of the current passing through it reaches a threshold value, designated as $I_{peak}$. In other words, the opening of the switch 22 is actuated when the value of the current passing through the coil 21 reaches the threshold value $I_{peak}$.

For this purpose, the comparator 23 is configured to compare the value of the current passing through the coil 21 with the threshold value $I_{peak}$.

The control module 30 (commonly known as the "driver") is configured to control the opening of the fuel injectors from a so-called "injector actuation" current delivered by the converter 20.

The control module 30 is configured to empty the capacitor C in order to actuate the opening of an injector. The operation of such a control module 30 being known, it will not be described in any more detail.

The microcontroller 10 is configured to actuate the switch 22 of the converter 20.

Figure 3:
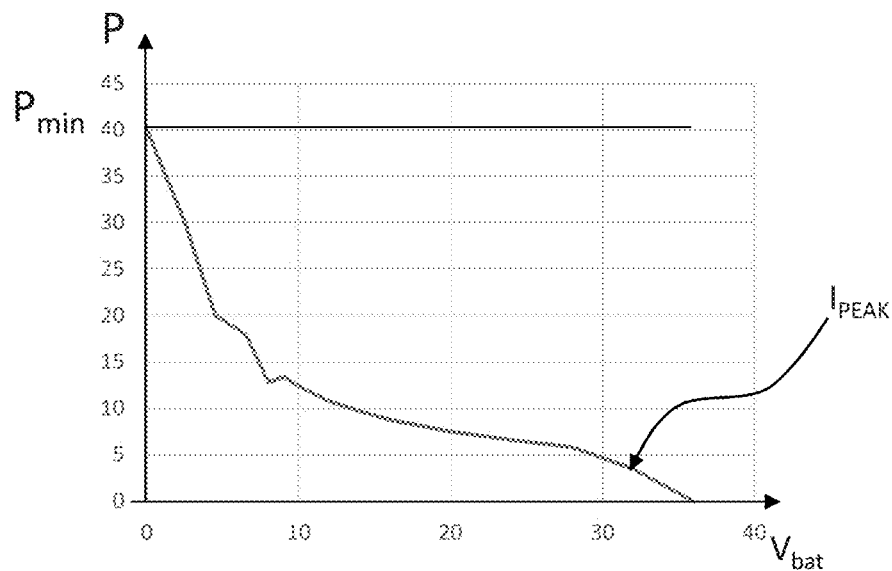
FIG. 3 illustrates schematically a curve showing the development of the actuation current of the coil of the control unit in FIG. 2 as a function of the voltage supplied by the vehicle battery.

The microcontroller 10 comprises a memory area in which is recorded a curve of the development of the threshold value of the current $I_{peak}$ as a function of the value of the voltage $V_{bat}$ of the current delivered by the battery 2, illustrated in FIG. 3. This curve is determined beforehand as described below.

The microcontroller 10 is configured to measure the value of the voltage $V_{bat}$ of the current delivered by the battery 2. Such a measurement may in particular be carried out, for example, by means of an analogue-to-digital converter 110 (FIG. 2) in a manner known per se, before starting the converter 20, but it may also be carried out periodically during the operation of the engine in order to detect a drop in the voltage $V_{bat}$ delivered by the battery 2.

The microcontroller 10 is further configured to determine a threshold value of the current $I_{peak}$ from the measured value of the voltage $V_{bat}$ and from the predetermined curve.

Lastly, the microcontroller 10 is configured to actuate the opening and closing of the switch 22 as a function of the determined threshold value of the current $I_{peak}$. For this purpose, the microcontroller 10 receives from the comparator 23 information relative to the value of the current passing through the coil 21 when the switch 22 is closed. When the comparator detects that the value of the current has reached the threshold value of the current $I_{peak}$, the microcontroller actuates the opening of the switch 21. This makes it possible to increase or decrease the power of the converter 20 so that said power is constant, despite variations in the voltage $V_{bat}$ supplied by the battery 2.

Figure 4:
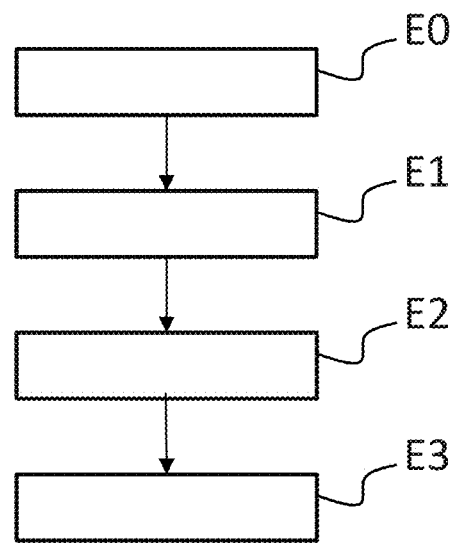
FIG. 4 illustrates schematically an embodiment of the method according to the invention.

An embodiment of the method for controlling the converter 20 according to the invention will now be described in reference to FIG. 4.

In a preliminary step E0, the curve of the development of the threshold value of the current $I_{peak}$ as a function of the value of the voltage $V_{bat}$ of the current delivered by the battery 2 is determined. The curve thus determined is then stored in the memory area of the microcontroller 10.

This preliminary step E0 is carried out during the design of the converter 20 or in the factory, in particular by simulation or on a test bench (laboratory measurements). The development curve thus determined is specific to a converter 20 and thus depends on the elements of such a converter 20. More precisely, each development curve is different and non-linear from one converter 20 to another because each converter 20 has different operating powers as a function of the range of operation of the battery voltage. Thus, a curve may in this way be determined for each converter 20.

When the vehicle is in use, especially before starting the converter 20, the value of the voltage $V_{bat}$ of the current delivered by the battery 2 is measured in a step E1. This measurement is then transmitted to the microcontroller 10 which then determines, by reading the development curve, the threshold value of the current $I_{peak}$ associated with the measured value of the voltage $V_{bat}$ in a step E2.

During operation of the engine, the current passing through the coil 21 is then measured and compared, by the comparator 23, with the threshold value of the current $I_{peak}$.

When the measured current reaches the threshold value of the current $I_{peak}$, the microcontroller 10 actuates, in a step E3, the opening of the switch 22. This makes it possible to adapt the power P of the converter 20 to the voltage $V_{bat}$ supplied by the battery 2 by changing the threshold value of the current $I_{peak}$.

The invention claimed is:

1. A method for controlling a DC/DC voltage converter to control a current of at least one fuel injector of an internal combustion engine of a motor vehicle, said DC/DC voltage converter including an induction coil connected to a vehicle battery configured to supply said coil with current and to a switch actuated alternately in a passing state of passing the current through the coil or in a blocking state of blocking the current through the coil, alternation of the passing and blocking states of the switch allowing the converter to deliver an output voltage to terminals of an intermediate capacitor, discharge of the output voltage being actuated by a driver in order to actuate the at least one fuel injector, the method comprising:

measuring a present value of a battery voltage delivered by the battery during use of the motor vehicle;

determining a threshold value of the current passing through the coil from: (i) the measured value of the battery voltage measured during use of the motor vehicle and (ii) a predetermined curve of a reference current passing through the coil as a function of a reference value of the battery voltage prior to use of the motor vehicle; and actuating opening of the switch when the current passing through the coil reaches the determined threshold value.

2. The method as claimed in claim 1, wherein a power of the converter is defined by the threshold value of the current passing through the coil and by the value of the battery voltage of the current delivered by the battery, the power being regulated around a predetermined value.

3. The method as claimed in claim 2, wherein the measuring the value of the battery voltage is carried out before starting the DC/DC voltage converter.

4. The method as claimed in claim 3, further comprising determining the predetermined curve before the measuring.

5. The method as claimed in claim 4, wherein the predetermined curve is determined by simulation or by laboratory measurement.

6. The method as claimed in claim 2, further comprising determining the predetermined curve before the measuring.

7. The method as claimed in claim 6, wherein the predetermined curve is determined by simulation or by laboratory measurement.

8. The method as claimed in claim 1, wherein the measuring the value of the battery voltage is carried out before starting the DC/DC voltage converter.

9. The method as claimed in claim 8, further comprising determining the predetermined curve before the measuring.

10. The method as claimed in claim 9, wherein the predetermined curve is determined by simulation or by laboratory measurement.

11. The method as claimed in claim 1, further comprising determining the predetermined curve before the measuring.

12. The method as claimed in claim 11, wherein the predetermined curve is determined by simulation or by laboratory measurement.

13. The method as claimed in claim 12, wherein said predetermined curve is stored in a memory area of a controller of the vehicle.

14. The method as claimed in claim 11, wherein said predetermined curve is stored in a memory area of a controller of the vehicle.

15. A controller configured to be mounted in a motor vehicle with an internal combustion engine, said internal combustion engine including at least one fuel injector, said controller comprising:

a DC/DC voltage converter configured to control a current of said at least one fuel injector, said DC/DC voltage converter comprising
an induction coil connected to a vehicle battery configured to supply said coil with current, and to a switch actuated alternately in a state of passing the current though the coil or in a state of blocking the current through the coil, alternation of passing and blocking states of the switch allowing the converter to deliver an output voltage to terminals of an intermediate capacitor, discharge of the output voltage being actuated by a driver in order to actuate the at least one fuel injector, wherein the controller is configured to
measure a value of a battery voltage delivered by the battery,
determine a threshold value of the current passing through the coil from: (i) the measured value of the battery voltage measured during use of the motor vehicle and (ii) a predetermined curve of a reference current passing through the coil as a function of a reference value of the battery voltage prior to use of the motor vehicle, and
actuate opening of the switch when the current passing through the coil reaches the determined threshold value.

16. The controller as claimed in claim 15, wherein said controller is configured to measure the value of the voltage before starting the DC/DC voltage converter.

17. The controller as claimed in claim 16, wherein said controller comprises at least one memory area in which the predetermined curve of the current passing through the coil is stored as a function of the voltage delivered by the battery.

18. The controller as claimed in claim 15, wherein said controller comprises at least one memory area in which the predetermined curve of the current passing through the coil is stored as a function of the voltage delivered by the battery.

19. A motor vehicle comprising:
the internal combustion engine comprising the at least one fuel injector; and
the controller as claimed in claim 15 configured to control said at least one fuel injector.

20. The method as claimed in claim 2, wherein the power is regulated around the predetermined value of the order of 40 Watt.

* * * * *